United States Patent
Nakao et al.

(10) Patent No.: US 7,548,496 B2
(45) Date of Patent: Jun. 16, 2009

(54) OPTICAL RECORDING AND REPRODUCING APPARATUS

(75) Inventors: Kenji Nakao, Gifu (JP); Noboru Mamiya, Daito (JP); Ken Hirose, Higasiosaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 473 days.

(21) Appl. No.: 11/293,269

(22) Filed: Dec. 5, 2005

(65) Prior Publication Data

US 2006/0126462 A1 Jun. 15, 2006

(30) Foreign Application Priority Data

Dec. 9, 2004 (JP) ............................. 2004-356595

(51) Int. Cl.
*G11B 7/00* (2006.01)

(52) U.S. Cl. ................................. 369/47.53; 369/47.52

(58) Field of Classification Search .............. 369/13.26, 369/47.53, 13.27, 47.5, 53.26, 116
See application file for complete search history.

(56) References Cited

U.S. PATENT DOCUMENTS

| | | | | |
|---|---|---|---|---|
| 6,115,338 | A | * | 9/2000 | Masaki et al. ............. 369/47.52 |
| 7,369,469 | B2 | | 5/2008 | Watanabe et al. |
| 2002/0105874 | A1 | * | 8/2002 | Matsumoto .............. 369/47.53 |
| 2007/0104058 | A1 | * | 5/2007 | Horikawa et al. ......... 369/47.53 |

FOREIGN PATENT DOCUMENTS

| | | | |
|---|---|---|---|
| CN | 1606076 | A | 4/2005 |
| JP | 3096239 | | 8/2000 |
| JP | 2002-260230 | | 9/2002 |
| JP | 2003-346348 | | 12/2003 |
| JP | 2004310997 | A * | 11/2004 |
| JP | 2005-100610 | A | 4/2005 |

(Continued)

OTHER PUBLICATIONS $1^{st}$ Office Action issued Apr. 13, 2007 in Corresponding Chinese Patent Application No. 200510129504.4.

(Continued)

*Primary Examiner*—Wayne R Young
*Assistant Examiner*—Brian Butcher
(74) *Attorney, Agent, or Firm*—Westerman, Hattori, Daniels & Adrian, LLP.

(57) ABSTRACT

An optimum power set value Pwp1 for Layer 1 obtained by an OPC is used as an initial value Pw21 of the OPC for Layer 2. At this time, an inclination Ia is obtained from an approximation line of a β value for Layer 1 (recording power to the β value) obtained by the OPC. From the β value obtained by performing a test recording at the initial value Pw21 and the inclination Ia, an approximation line of a β value for Layer 2 (recording power to the β value) is obtained. Then, on the obtained approximation line, a laser power for providing a target β value (βt) is obtained, and set as an optimum power Pwp2 for Layer 2. Thus, an optimum power setting conforming to characteristics of a disc can be performed. As a result, setting the optimum power for Layer 2 can be performed more smoothly and quickly.

6 Claims, 11 Drawing Sheets

FOREIGN PATENT DOCUMENTS

| | | |
|---|---|---|
| JP | 2005-251361 | 9/2005 |
| JP | 2005-285273 | 10/2005 |

OTHER PUBLICATIONS

2nd Office Action issued Dec. 14, 2007 in Corresponding Chinese Patent Application No. 200510129504.4.

Office Action mailed Nov. 18, 2008 in Corresponding Japanese Patent Application No. 2004-356595.

Office Action issued Jul. 11, 2008 in Corresponding Chinese Patent Application No. 200510129504.4.

* cited by examiner

OPTICAL RECORDING AND REPRODUCING APPARATUS

BACKGROUND OF THE INVENTION

1. Field of the Invention

The present invention relates to an optical recording and reproducing apparatus and more particularly to an optical recording and reproducing apparatus suitably used when information is recorded on and reproduced from an optical recording medium having plural recording layers arranged in its layer direction.

2. Description of the Related Art

Nowadays, various optical recording media such as a CD (Compact Disc) and a DVD (Digital Versatile Disc) are commercialized and widely spread. Among those recording media, in write-once media such as CD-R and DVD-R and rewritable media such as CD-RW and DVD-RW, a process for setting a laser power to an optimum value is performed first (OPC: Optimum Write Power Control), and a recording operation is then executed. For example, in the CD-R or DVD-R, as shown in JP 2002-260230 A for instance, power setting (OPC) is performed following β method. That is, test write is performed at a predetermined power on a power adjustment portion previously set on a disc to obtain a β value from its reproduction RF signal (asymmetry). Then, the obtained β value and a target β value (βt) desired on the disc are compared with each other to set the optimum power at the time of recording.

FIG. 10 shows a calculation method for the β value. As shown in FIG. 10, the β value is obtained by calculating $\beta = (Itop + Ibtm)/(Itop - Ibtm)$ from asymmetry amplitude values Itop and Ibtm with respect to a reference potential Iref.

The laser power at the test write is set to an initial power previously recorded into a lead-in of the disc or an initial power previously set on the drive side as an initial value. Test write is performed using this initial power Pw1 to obtain the β value, the obtained β value and the target value βt are compared with each other to obtain a laser power Pw2 used at the next test write. Then, test write is performed again using the obtained power Pw2 to further obtain the β value.

When the test write is performed two times, as shown in FIG. 11, the test write is performed using the powers Pw1 and Pw2. The obtained β1 and β2 are subjected to linear approximation, and a laser power at which βt is given is obtained on the approximation line. The obtained laser power is directly set as the optimum laser power or verification is conducted whether the power can be set as the optimum laser power. In the verification, test write is performed using this power again, and an error rate when this test-written data is reproduced is obtained. Then, it is judged whether this error rate is smaller than a threshold, and when the error rate is smaller than the threshold, this laser power is set as the optimum laser power. After that, the recording operation starts at the thus set optimum laser power.

Incidentally, a disc having plural recording layers arranged on one side has been developed and commercialized recently. For example, JP 2003-346348 A discloses a DVD-R having two recording layers arranged on one side and a drive apparatus for the same.

When a disc has plural recording layers arranged on one side in this way, it is necessary to perform an optimum laser power setting process for each recording layer. However, in this case, if the power setting process is executed on each recording layer, there is a problem in that it takes a long time to complete the power setting process. For example, even when the number of times for performing the operation for obtaining the β value is limited to two as described above, if a checking is performed thereafter, it is necessary to perform the test write by three times and its reproducing process for each recording layer. Therefore, when there are arranged two recording layers, it is necessary to perform the test write by six times and the corresponding reproducing process.

SUMMARY OF THE INVENTION

The present invention has been made to solve the above-mentioned problems, and it is therefore an object of the invention to provide an optical recording and reproducing apparatus capable of quickly and smoothly performing an optimum power setting process.

According to a first aspect of the present invention, there is provided an optical recording and reproducing apparatus for recording information on an optical recording medium having plural recording layers arranged in a laminating direction and reproducing the information from the optical recording medium, including: laser power setting means for using an optimum power set value Pwpn obtained from a result of performing a test recording on a recording layer n as an initial power value in the test recording on another recording layer m to set an optimum power Pwpm for the other recording layer m.

According to the optical recording and reproducing apparatus according to this aspect, since the optimum power set value at the recording layer n is used as the initial power for the test recording on the recording layer m, as compared with a case of uniformly using the set values and the like previously set in the drive, the power setting can be performed more conformingly to the disc characteristics. As a result, the optimum power setting for the recording layer m can be quickly and smoothly performed.

According to this aspect, the laser power setting means includes: means for approximating a relation Rn between a recording power and a characteristic parameter of the recording layer n from the result of performing the test recording on the recording layer n; means for obtaining the optimum power set value Pwpn for the recording layer n from the relation Rn and a target value of the characteristic parameter; means for setting the optimum power set value Pwpn for the recording layer n as the initial power value in the test recording on the other recording layer m; means for approximating a relation Rm between a recording power and a characteristic parameter of the other recording layer m based on the characteristic parameter obtained from the result of performing the test recording on the other recording layer m and the relation Rn between the recording power for the recording layer n and the characteristic parameter; and means for obtaining an optimum power set value Pwpm for the other recording layer m from the relation Rm and a target value of the characteristic parameter.

More specifically, the laser power setting means further includes: means for obtaining plural β values from the result of performing the test recording on the recording layer n; means for obtaining an approximation line Ln for approximating a relation between the recording power and the β value from the plural β values; means for obtaining the optimum power set value Pwpn for the recording layer n from the approximation line Ln and the target β value; means for obtaining an inclination In of the approximation line Ln; means for setting the optimum power set value Pwpn as the initial power value in the test recording on the other recording layer m; means for obtaining a β value from the result of test recording on the other recording layer m; means for obtaining an approximation line Lm for approximating a relation between the recording power and the β value from the β value obtained from the result of test recording on the other recording layer m and the inclination In; and means for obtaining the optimum power set value Pwpm for the other recording layer m from the approximation line Lm and the target β value.

By thus structuring the laser power setting means, the number of times of the test recording on the recording layer m can be suppressed, so the operation in the optimum power setting can be performed more quickly. Also, the optimum power Pwpm for the recording layer m is obtained based on the approximation relation Rm or the approximation line Lm, so the optimum power Pwpm can be substantially matched to the expected optimum power.

According to the first aspect, the laser power setting means includes: means for setting the optimum power set value Pwpn for the recording layer n as the initial power in the test recording on the other recording layer m; means for setting a power value for a further test recording on the other recording layer m from the result of the test recording at the initial power value on the other recording layer m; means for approximating a relation Rm between a recording power and a characteristic parameter of the other recording layer m based on the results of the test recording at the initial power and the further test recording on the other recording layer m; and means for obtaining an optimum power Pwpm for the other recording layer m from the relation Rm and a target value of the characteristic parameter.

More specifically, the laser power setting means further includes: means for obtaining plural β values from the result of performing the test recording on the recording layer n; means for obtaining an approximation line Ln for approximating a relation between the recording power for the recording layer n and the β value from the plural β values; means for obtaining the optimum power set value Pwpn for the recording layer n from the approximation line Ln and the target β value; means for setting the optimum power set value Pwpn as the initial power value in the test recording on the other recording layer m; means for setting a power value for a further test recording on the other recording layer m from the result of the test recording at the set initial power value on the other recording layer m; means for obtaining plural β values of the other recording layer m based on the results of the test recording at the initial power value and the further test recording on the other recording layer m; means for obtaining an approximation line Lm for approximating a relation between the recording power for the other recording layer m and the β value from the plural β values of the other recording layer m; and means for obtaining the optimum power set value Pwpm for the other recording layer m from the approximation line Lm and the target β value.

Furthermore, according to each of those aspects, the laser power setting means further includes means for obtaining information on a ratio of a laser light sensitivity of the recording layer m to the recording layer n, in which the laser power setting means sets a value obtained by multiplying the set value of the optimum power Pwpn obtained from the result of performing the test recording on the recording layer n by the ratio, as the initial power value in the test recording on the other recording layer m.

Note that the function of each means in the present invention is mainly realized by a controller 111 in an embodiment mode described below. Further, the present invention relates to an optical recording and reproducing apparatus and the term "reproducing" herein includes a case where the information recorded in the test recording in setting the laser power is merely reproduced without performing reproduction of user data.

BRIEF DESCRIPTION OF THE DRAWINGS

The above and further objects and novel features of the invention will be more fully apparent from the following detailed description when the same is read in connection with the accompanying drawings.

DETAILED DESCRIPTION OF THE PREFERRED EMBODIMENTS

Hereinafter, an embodiment mode of the present invention will be described based on the accompanying drawings. Note that this embodiment mode is made by applying the present invention to an optical disc drive for recording and reproducing information on a DVD+R having two recording layers arranged on one side.

Figure 1:
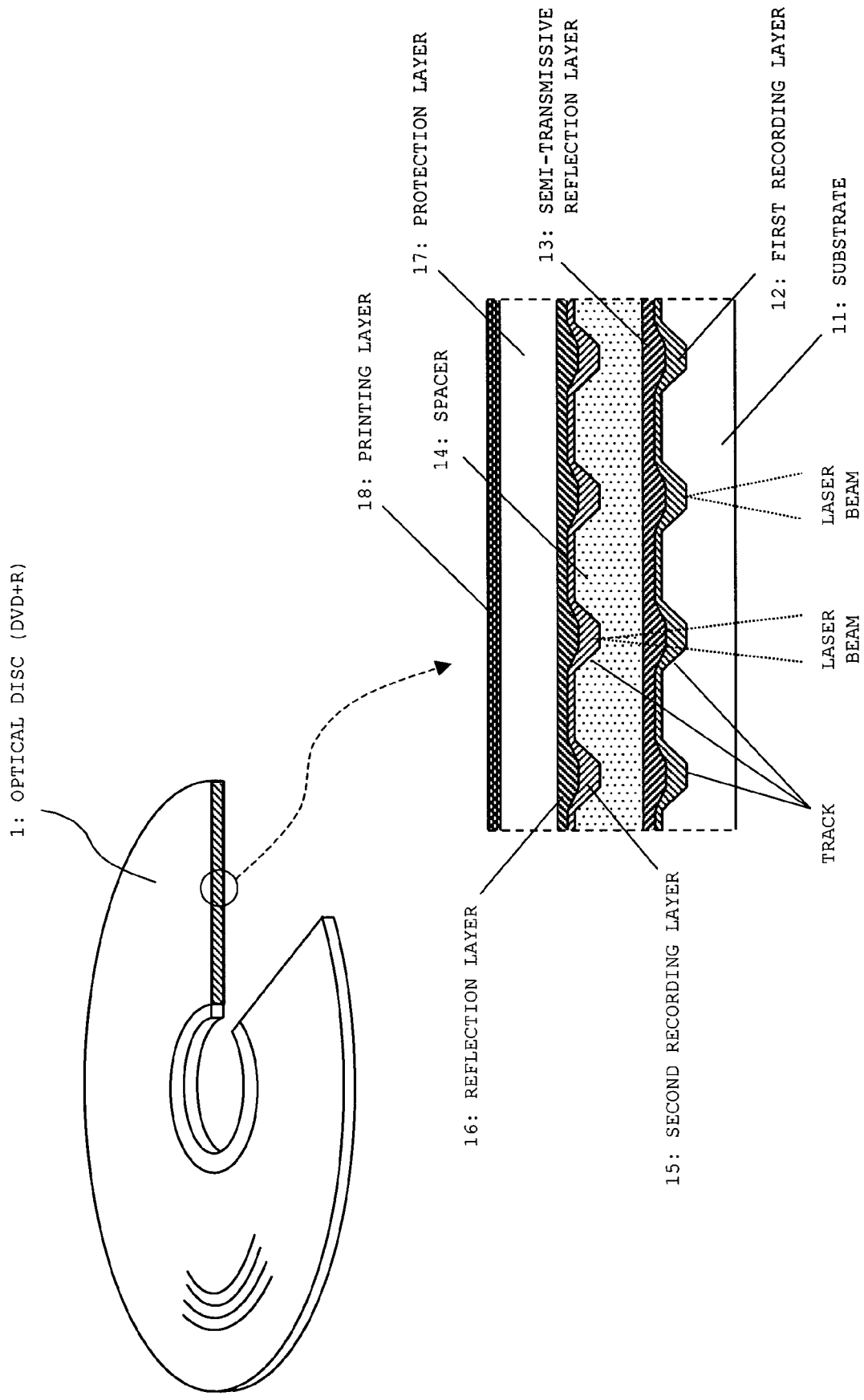
FIG. 1 shows a structure of an optical disc according to an embodiment mode.

First, FIG. 1 shows a structure of an optical disc according to the embodiment mode. As shown in FIG. 1, an optical disc 1 includes a substrate 11, a first recording layer 12 formed on the substrate 11, a semi-transmissive reflection layer 13 formed on the first recording layer 12, a spacer 14 formed on the semi-transmissive reflection layer 13, a second recording layer 15 formed on the spacer 14, a reflection layer 16 formed on the second recording layer 15, a protection layer 17 formed on the reflection layer 16, and a printing layer 18 formed on the protection layer 17.

Formed on each of the first recording layer 12 and the second recording layer 15 is a spiral track from an inner periphery toward an outer periphery, and data recording and reproducing are performed on this track. Here, the track at the first recording layer 12 and the track at the second recording layer 15 have opposite turn directions. When recording/reproducing the information for the first recording layer 12 and the second recording layer 15, the disc rotates in the same direction. At this time, recording is performed on the first recording layer 12 from the inner periphery toward the outer periphery, and recording is performed on the second recording layer from the outer periphery toward the inner periphery The track is wobbled in a radius direction, and address information is held by this wobble. That is, a phase modulation interval called ADIP (address in pre-groove) is inserted periodically in a monotone wobble interval. When the phase modulation interval is scanned with a beam, address information on the track is read from a change in its reflection light intensity and reproduced. In ADIP of the lead-in zone, various control data for the disc is recorded through phase modulation, which includes identification information of a disc manufacturer (manufacturer ID) which has manufactured the disc.

Figure 2:
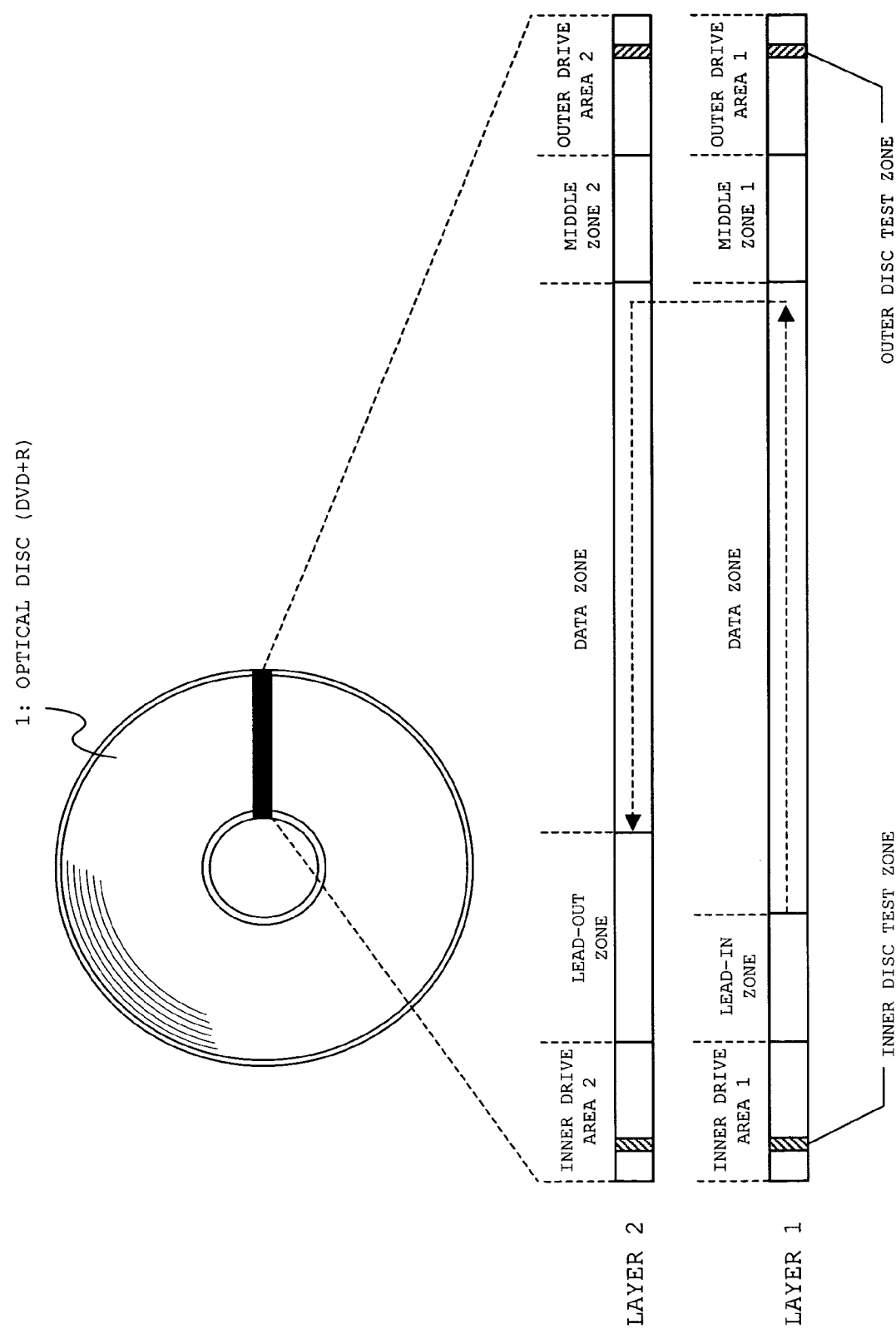
FIG. 2 shows an area format of the optical disc according to the embodiment mode.

FIG. 2 shows an area format of the optical disc 1.

As shown in FIG. 2, the first recording layer 12 (Layer 1) is divided into, from the inner periphery toward the outer periphery, an inner drive area 1, a lead-in zone, a data zone, a middle zone 1, and an outer drive area 1. The second recording layer 15 (Layer 2) is divided into, from the inner periphery toward the outer periphery, an inner drive area 2, a lead-out zone, a data zone, a middle zone 2, and an outer drive area 2. Further, the inner drive areas 1 and 2 and the outer drive area 1 and 2 are divided into various zones, in which a laser power initial setting (OPC) is performed using an inner disc test zone and an outer disc test zone.

Figure 3:
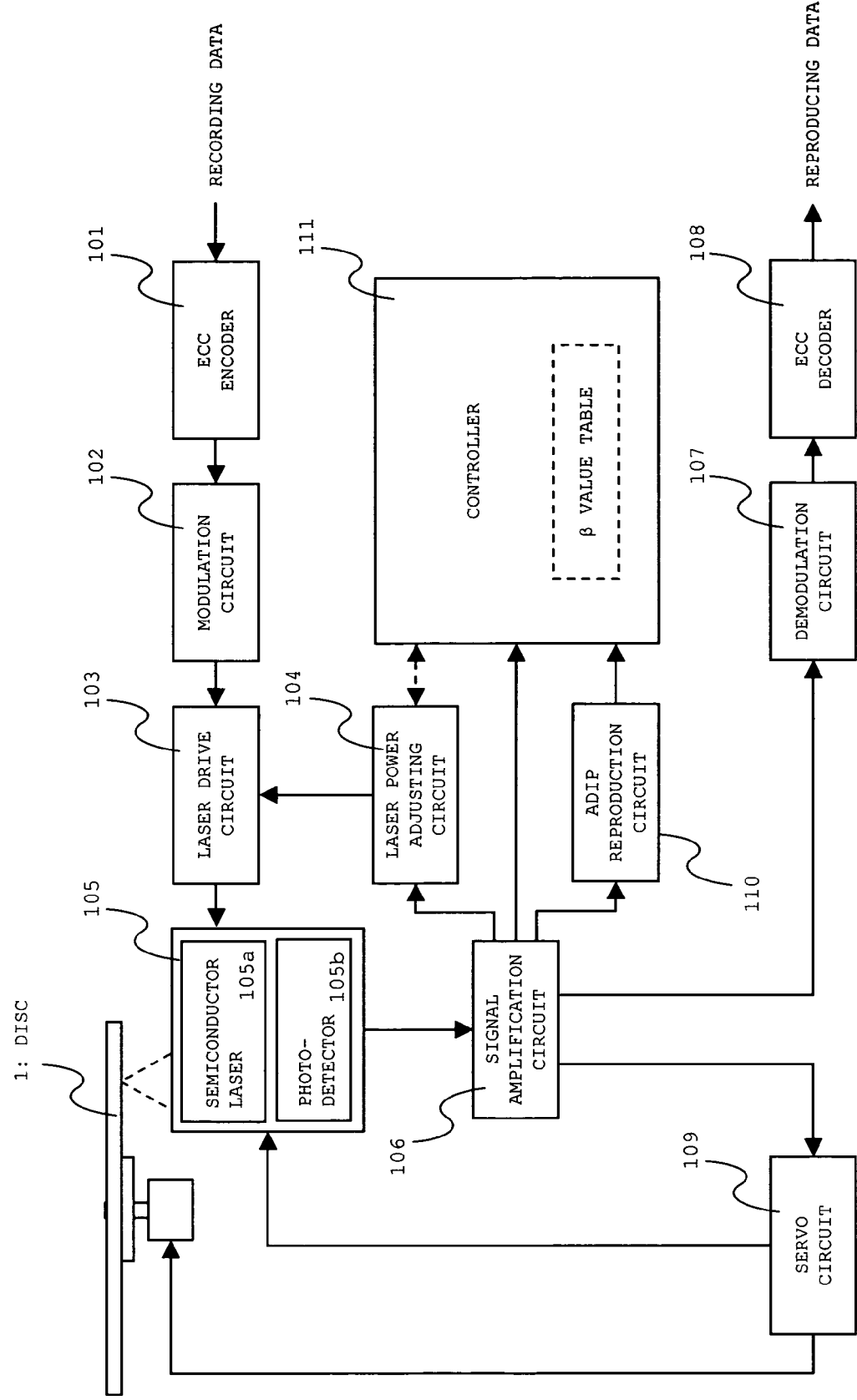
FIG. 3 shows a structure of an optical disc drive according to the embodiment mode.

FIG. 3 shows a structure of the optical disc drive according to the embodiment mode.

As shown in FIG. 3, the optical disc drive includes an ECC encoder 101, a modulation circuit 102, a laser drive circuit 103, a laser power adjusting circuit 104, an optical pickup 105, a signal amplification circuit 106, a demodulation circuit 107, an ECC decoder 108, a servo circuit 109, an ADIP reproduction circuit 110, and a controller 111.

The ECC encoder 101 performs an encode processing such as addition of an error-correcting code on the input recording data, and outputs the resultant data to the modulation circuit 102. The modulation circuit 102 performs a predetermined modulation on the input recording data to further generate a recording signal to be output to the laser drive circuit 103. The laser drive circuit 103 outputs a drive signal in accordance with the recording signal from the modulation circuit 102 to a semiconductor laser 105a in recording, and outputs a drive signal for outputting a laser beam at a constant intensity to the semiconductor laser 105a in reproducing. Here, the laser power is set to a laser power adjusted and set by laser power adjusting circuit 104.

The laser power adjusting circuit 104 performs the initial setting (OPC) for the laser power in recording and reproducing in accordance with the set value supplied from the controller 111, appropriately adjusts (R-OPC: Running Optical Power Control) the set laser power in accordance with the adjusted value supplied from the controller 111, and supplies the adjusted laser power to the laser drive circuit 103. Here, the laser power initial setting (OPC) is performed based on a target β value (βt) of the disc of interest. That is, the controller 111 obtains the target β value (βt) of the disc, and sets the recording laser power to the optimum power for the disc based on the obtained βt. The detail of the OPC will be described later.

Note that in recording, the track is irradiated with a pulsed laser beam having plural stages of intensity levels. That is, the laser power adjusting circuit 104 controls the laser drive circuit 103 so that a laser beam having a previously specified pulse shape (strategy) is output from the optical pickup 105. Layer 1 and Layer 2 have different strategies, and therefore Layer 1 and Layer 2 are adjusted to have the same sensitivity to the laser beam. Information on the strategies of Layer 1 and Layer 2 is included in the ADIP of the lead-in zone. The laser power adjusting circuit 104 sets the strategies of Layer 1 and Layer 2 in the recording operation based on the information on the strategies.

The optical pickup 105 includes the semiconductor laser 105a and a photo-detector 105b, and performs write/read of data for the disc through convergence of the laser beam on the track. Note that the optical pickup 105 further includes an objective lens actuator for adjusting the irradiation condition of the laser beam for the track, an optical system for guiding the laser beam output from the semiconductor laser 105 to the objective lens and guiding the reflection light from the disc 100 to the photo-detector 105b, etc.

The signal amplification circuit 106 generates various signals by amplifying and computing the signals received from the photo-detector 105b to output them to the corresponding circuits. The demodulation circuit 107 generates reproduction data by demodulating the reproduction RF signal input from the signal amplification circuit 106 and outputs the reproduction data to the ECC decoder 108. The ECC decoder 108 performs a decoding process such as error correction to the data input from the demodulation circuit 107 and outputs the resultant data to the subsequent circuit.

The servo circuit 109 generates a focus servo signal and a tracking servo signal from a focus error signal and a tracking error signal input from the signal amplification circuit 106 and outputs the generated signals to the objective lens actuator of the optical pickup 105. Also, the servo circuit 109 generates a motor servo signal from a wobble signal input from the signal amplification circuit 106 and outputs the generated signal to a disc drive motor.

The ADIP reproduction circuit 110 reproduces address information and various control information from the wobble signal input from the signal amplification circuit 106 and outputs the reproduced information to the controller 111.

The controller 111 stores various data in a built-in memory while controlling each part in accordance with the previously set program.

Note that the controller 111 holds a β value table in which the manufacturer ID is associated with the target β value (βt). The controller 111 refers to the β value table to read out the target β value (βt) corresponding to the manufacture ID obtained from the lead-in zone (ADIP) of the disc, and outputs the read value to the laser power adjusting circuit 104. According to this value, the laser power adjusting circuit 104 performs the recording laser power initial setting.

Embodiment 1

Figure 4:
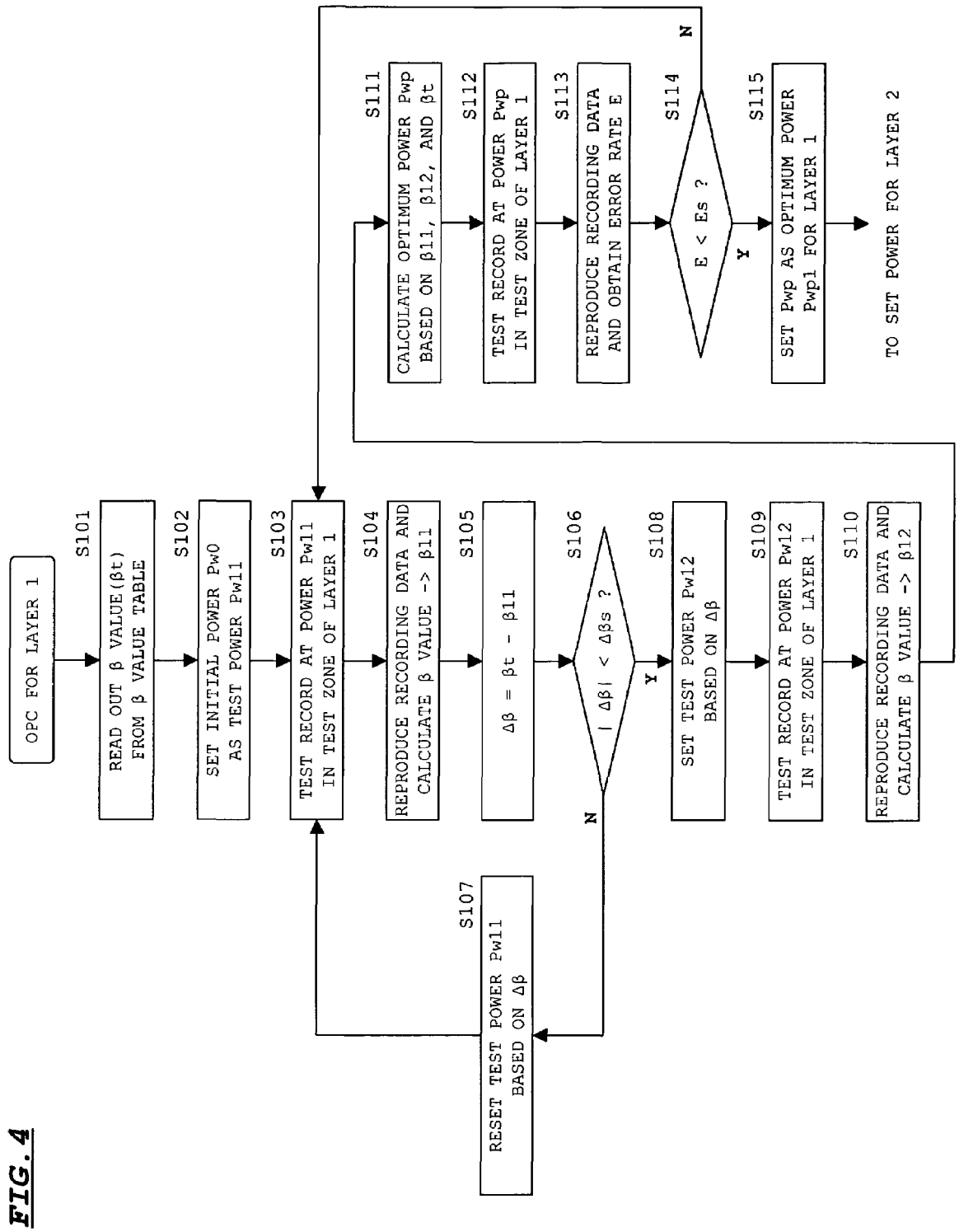
FIG. 4 is a flowchart of a power setting process of Layer 1 according to Embodiment 1.
Figure 5:
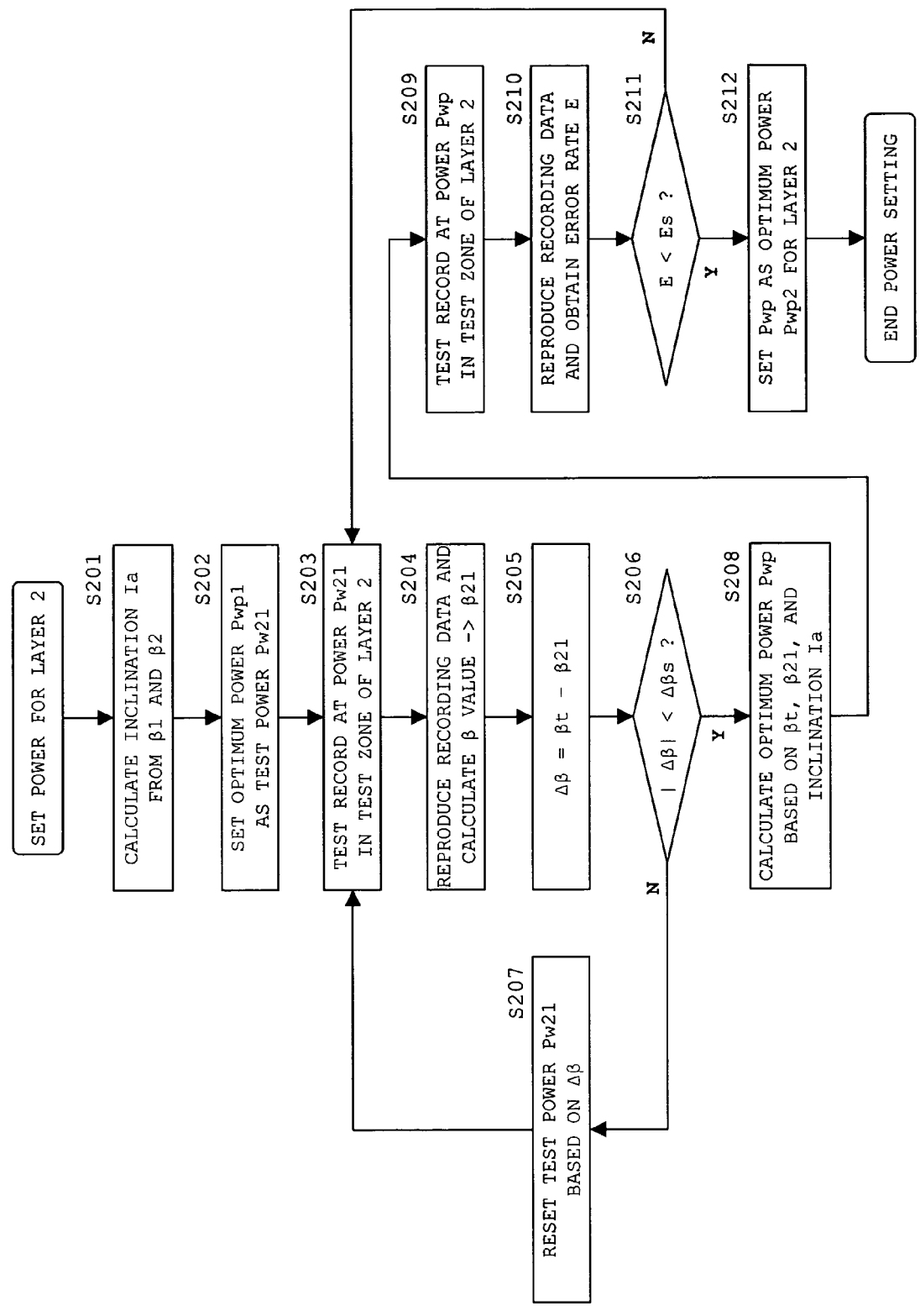
FIG. 5 is a flowchart of a power setting process of Layer 2 according to Embodiment 1.

FIGS. 4 and 5 are operation flowcharts showing the OPC.

Referring to FIG. 4, when the initial power setting operation starts, the controller 111 reads out the target β value (βt) from the β value table based on the manufacturer ID of the disc (S101). Note that when the corresponding manufacturer ID is not included in the β value table, the average β value is read out from the β value table. To cope with such cases, the β value table stores an average β value for general use.

Further, the controller 111 sets the initial power Pw0 previously stored in the built-in memory as the first test power Pw11 in the OPC operation for Layer 1 (S102), and at the test power Pw11, test data is written to the test zone of Layer 1 (usually, the inner disc test zone is used) (S103). Then, the written test data is reproduced to calculate the β value, and set the calculated β value as β11 (S104).

Thereafter, the controller 111 obtains a difference Δβ between β11 and the target β value (βt) (S105), and judges whether the obtained Δβ is smaller than the predetermined threshold βs (S106). Here, when |Δβ|≧βt, based on the sign (positive or negative) and the magnitude of Δβ, the test power Pw11 is reset to be close to the optimum power (S107), and the process of S103 and the subsequent steps is repeated at the test power Pw11 after the resetting.

On the other hand, when |Δβ|<βs, based on the sign (positive or negative) and the magnitude of Δβ, the next test power Pw12 is set (S108), and at the test power Pw12 after the setting, similarly to the above, test data is written in the test zone of Layer 1 (S109). Then, the written test data is reproduced to calculate the β value, and the calculated β value is set as β12 (S110).

Figure 11:
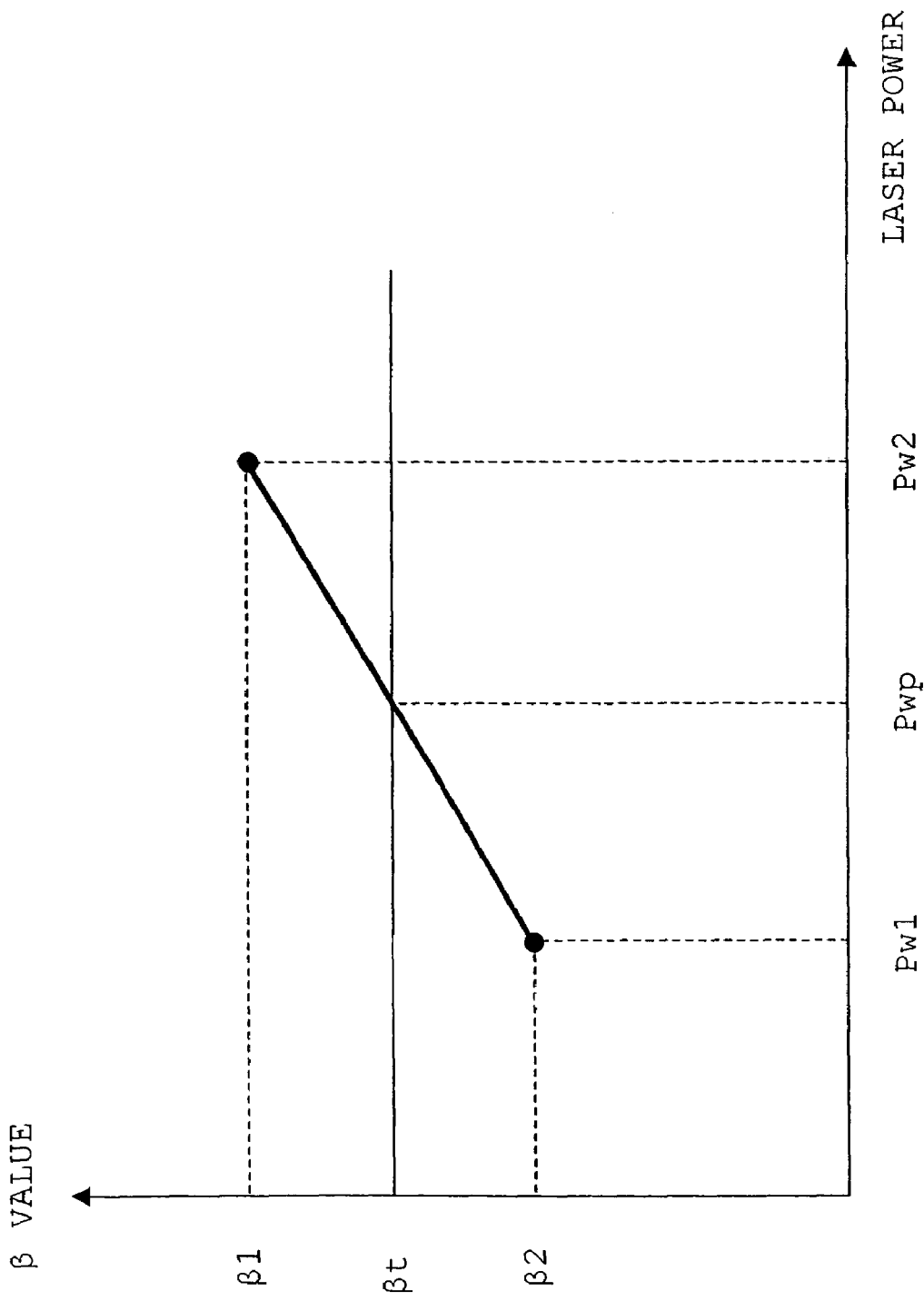
FIG. 11 is a drawing for explaining a calculation method for an approximation line of the β value and an optimum power Pwp.

Thereafter, the controller 111 performs linear approximation of β11 and β12 as shown in FIG. 11, and on this approximation line, the laser power for giving the target β value (βt) is calculated as the optimum power Pwp (S111). Next, at the power Pwp, test data is written to the test zone of Layer 1 (S112), and further, an error rate E obtained when this data is reproduced is obtained from the ECC decoder 108 (S113). Then, it is judged whether the obtained error rate E is smaller than the threshold Es (S114), and when it is not smaller than the threshold Es, the flow returns to S103 to repeat the above process. On the other hand, when E<Es, the power Pwp is set as the optimum power Pwp1 of Layer 1 (S115), and thereafter the power setting process for Layer 2 is performed.

Referring to FIG. 5, in the power setting process for Layer 2, first, an incline Ia of the approximation line shown in FIG. 11 is obtained from the previously obtained β1 and β2 (S201). Next, the optimum power Pwp1 for Layer 1 as described above is set as the test power Pw21 for Layer 2 in the OPC operation (S202), and at the test power Pw21, test data is written to the test zone of Layer 2 (usually, the inner disc test zone is used) (S203). Then, the written test data is reproduced to calculate the β value, and the calculated β value is set as β21 (S204).

After that, the controller 111 obtains a difference Δβ between β21 and the target β value (βt) (S205), and it is judged whether the obtained Δβ is smaller than the predetermined threshold Δβs (S206). Here, when |Δβ|≧βs, based on the sign (positive or negative) and the magnitude of Δβ, the test power Pw21 is reset to be close to the optimum power (S207), and the process of S203 and the subsequent steps is repeated at the test power Pw21.

On the other hand, when |Δβ|<βs, the approximation line is obtained from the inclination Ia obtained in S201 and β21, and on this approximation line, the laser power for providing the target β value (βt) is set as the optimum power Pwp (S208). Next, at the power Pwp, test data is written to the test zone of Layer 2 (S209), and further, the error rate E obtained when this data is reproduced is obtained from the ECC decoder 108 (S210). Then, it is judged whether the obtained error rate E is smaller than the threshold Es (S211), when the obtained error rate E is not smaller than the threshold Es, the flow returns to S203 to repeat the above process. On the other hand, when E<Es, the power Pwp is set as the optimum power Pwp2 for Layer 2 (S212), and the OPC operation for the disc ends.

According to this embodiment, in the OPC operation for Layer 2, calculation of the approximation line can be performed by one time of test record only, so the OPC operation for Layer 2 can be simplified and performed quickly. At this time, as the optimum power Pwp1 for Layer 1 is set as the initial power to obtain the β value, the β value can approach the target β value (βt), and the approximation line can be made similar to the desired approximation line. Therefore, as described above, when the test record is performed only once in the OPC operation, the optimum power setting for Layer 2 can be performed smoothly and satisfactorily.

Embodiment 2

In the above embodiment, in the OPC operation for Layer 2, the approximation line is obtained from the inclination Ia and β21. However, similarly to the OPC operation for Layer 1, two β values are obtained and based on those values, the approximation line may also be obtained.

Figure 6:
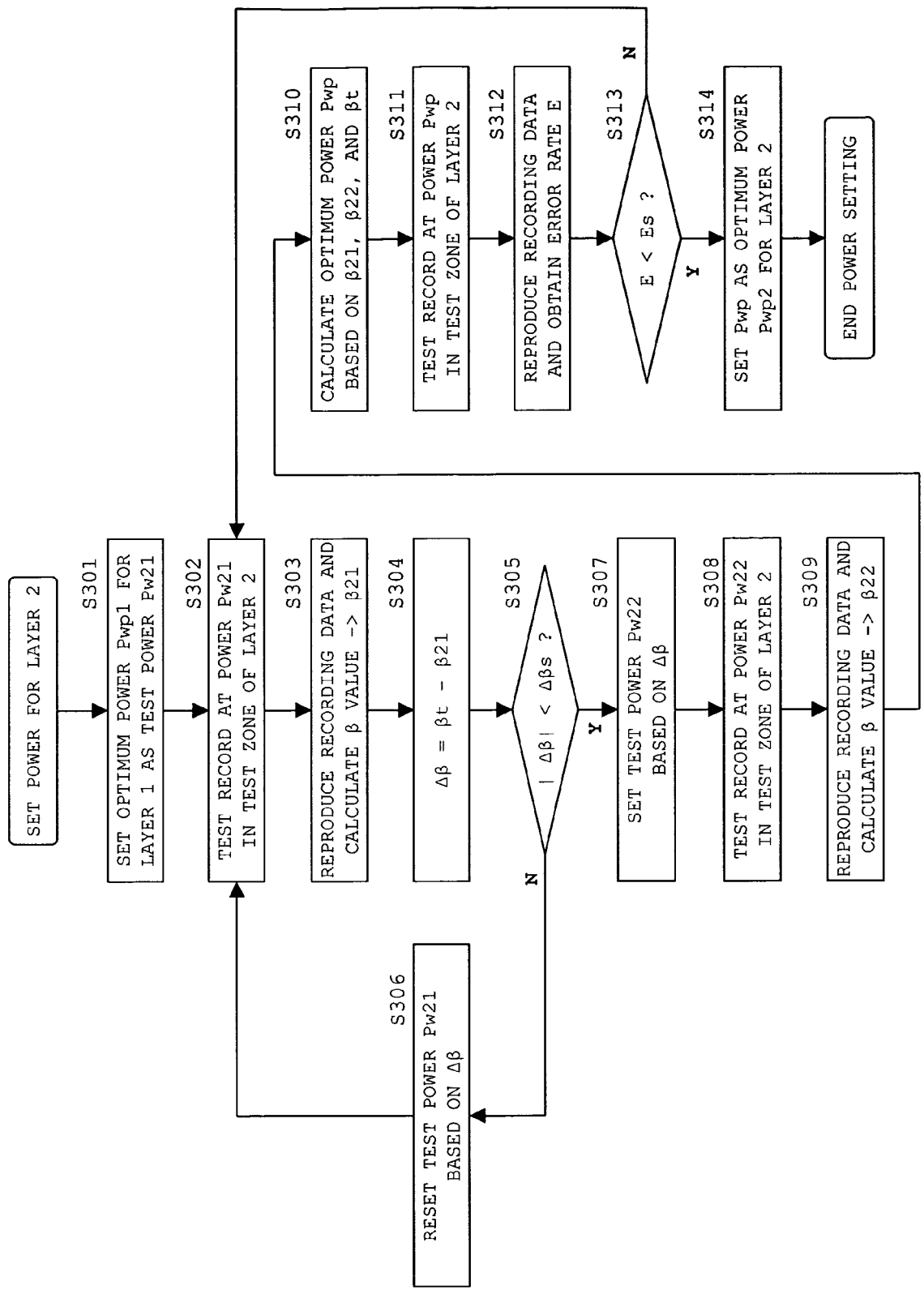
FIG. 6 is a flowchart of a power setting process of Layer 2 according to Embodiment 2.

FIG. 6 shows an operation flowchart for this case.

After the power setting process for Layer 1 ends as described above, when the power setting process for Layer 2 starts, the optimum power Pwp1 at Layer 1 is set as the initial test power Pw21 for Layer 2 (S301), and at the test power Pw21, test data is written to the test zone for Layer 2 (usually, the inner disc test zone is used) (S302). Then, the written test data is reproduced to calculate the β value, and the calculated β value is set as β21 (S303).

Thereafter, the controller 111 obtains the difference Δβ between β11 and the target β value (βt) (S304) to judge whether the obtained Δβ is smaller than the threshold Δβs (S305). Here, when |Δβ|≧βs, based on the sign (positive or negative) and the magnitude of Δβ, the test power Pw21 is reset to be close to the optimum power (S306), and the process of S302 and its subsequent steps is repeated at the test power Pw21 after the resetting.

On the other hand, when |Δβ|<βs, based on the sign (positive or negative) and the magnitude of Δβ, the next test power Pw22 is set (S307), and at the test power Pw22 after the setting, similarly to the above, test data is written in the test zone of Layer 2 (S308). Then, the written test data is reproduced to calculate the β value, and the calculated β value is set as β22 (S309).

Thereafter, the controller 111 performs linear approximation of β21 and β22 as shown in FIG. 11, and on this approximation line, the laser power for providing the target β value (βt) is calculated as the optimum power Pwp (S310). Next, at the power Pwp, test data is written to the test zone of Layer 2 (S311), and further an error rate E when this data is reproduced is obtained from the ECC decoder 108 (S312). Then, it is judged whether the obtained error rate E is smaller than the threshold Es (S313), and when the error rate is not smaller than the threshold Es, the flow returns to S302 to repeat the above process. On the other hand, when E<Es, the power Pwp is set as the optimum power Pwp2 of Layer 2 (S314), and thereafter the OPC operation for this disc ends.

According to this embodiment, as compared with Embodiment 1, a demerit occurs in that the number of performing the test recording is larger by one to obtain the β value. However, even in this case, as the optimum power Pwp1 for Layer 1 is used as the initial test power Pw21 for Layer 2, the β value thus obtained can be set close to the target β value (it), thereby smoothly transiting to the subsequent test recording. Thus, as compared with a case of using the power or the like previously set in the drive as the initial power of the OPC for Layer 2, the optimum power setting for Layer 2 can be quickly and smoothly performed.

Note that in Embodiment 1, when judged that E≧Es in S211 of FIG. 5, the flow returns to S203 but may transit to the process flow of FIG. 6 according to Embodiment 2. In this way, after judged that E≧Es in S211, it is possible to perform the optimum power setting for Layer 2 with more certainty.

Embodiment 3

In Embodiments 1 and 2, pulse waveforms (strategies) of Layer 1 and Layer 2 in the recording operation are set to conform to the respective layers, thereby equalizing sensitivities of Layer 1 and Layer 2 to laser beams. However, depending on an optical disc, a case is assumed where the strategies are not dissimilated, and the recording operation is performed at the same strategy. In this embodiment, a mode of applying the present invention to such optical disc drive is exemplified.

Figure 7:
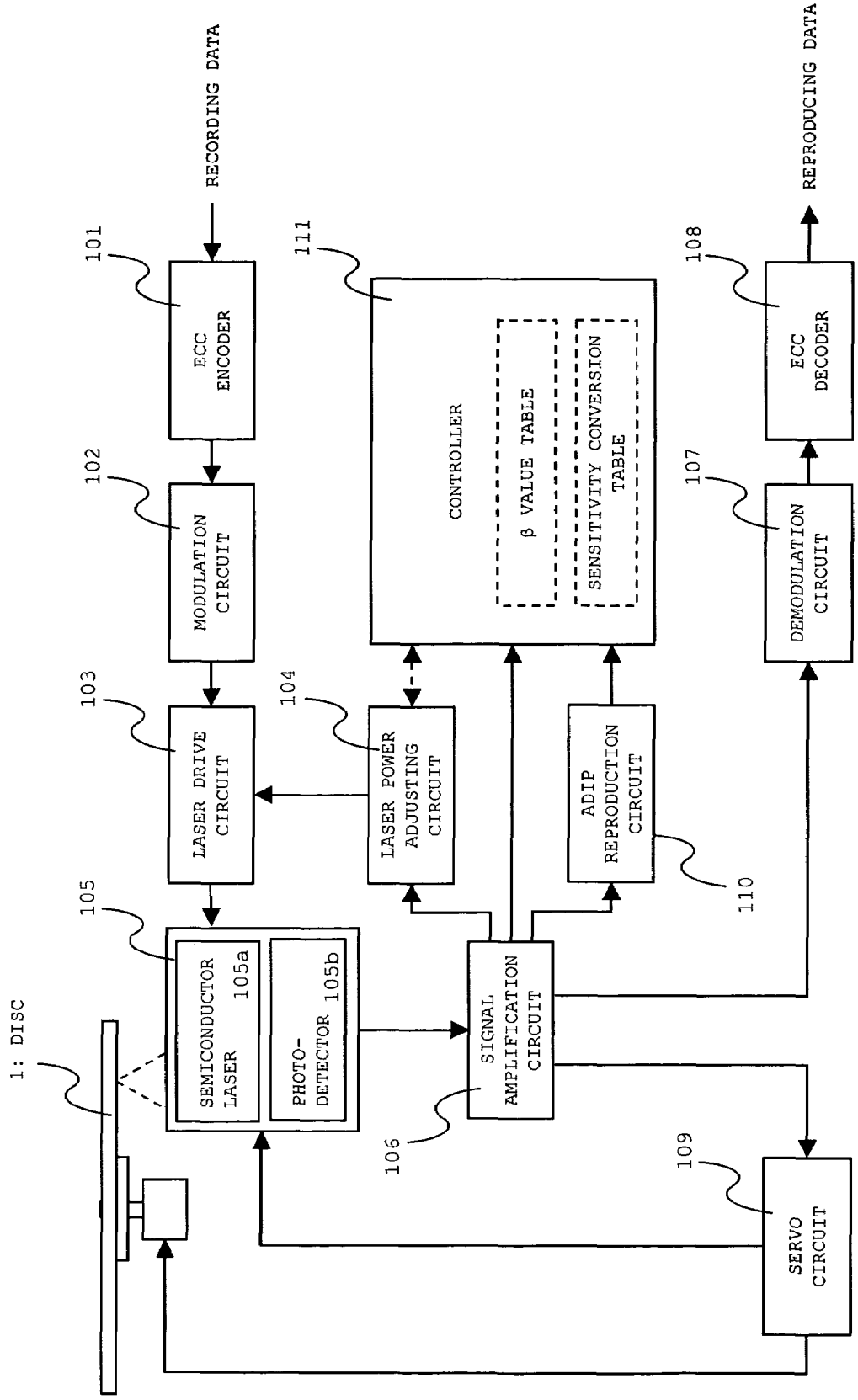
FIG. 7 is a structure of an optical disc drive according to Embodiment 3.

FIG. 7 shows a structure of the optical disc drive of this embodiment. Here, the controller 111 further holds a sensitivity conversion table, and in this point, the apparatus is different from the optical disc drive of FIG. 3 of the above embodiment. Other structures are the same as those of the optical disc drive of FIG. 3.

Here, the sensitivity conversion table is a table in which the laser beam sensitivity ratio of Layer 2 to Layer 1 is associated with manufacture IDs. To be specific, the table stores the laser beam sensitivity ratio in association with the manufacture IDs and indicates how many % of the laser beam intensity in Layer 2 as compared with the case of Layer 1 is necessary to realize substantially the same recording sensitivity to Layer 1 when pulse waveforms (strategies) in the recording operation are made equal to each other.

Figure 8:
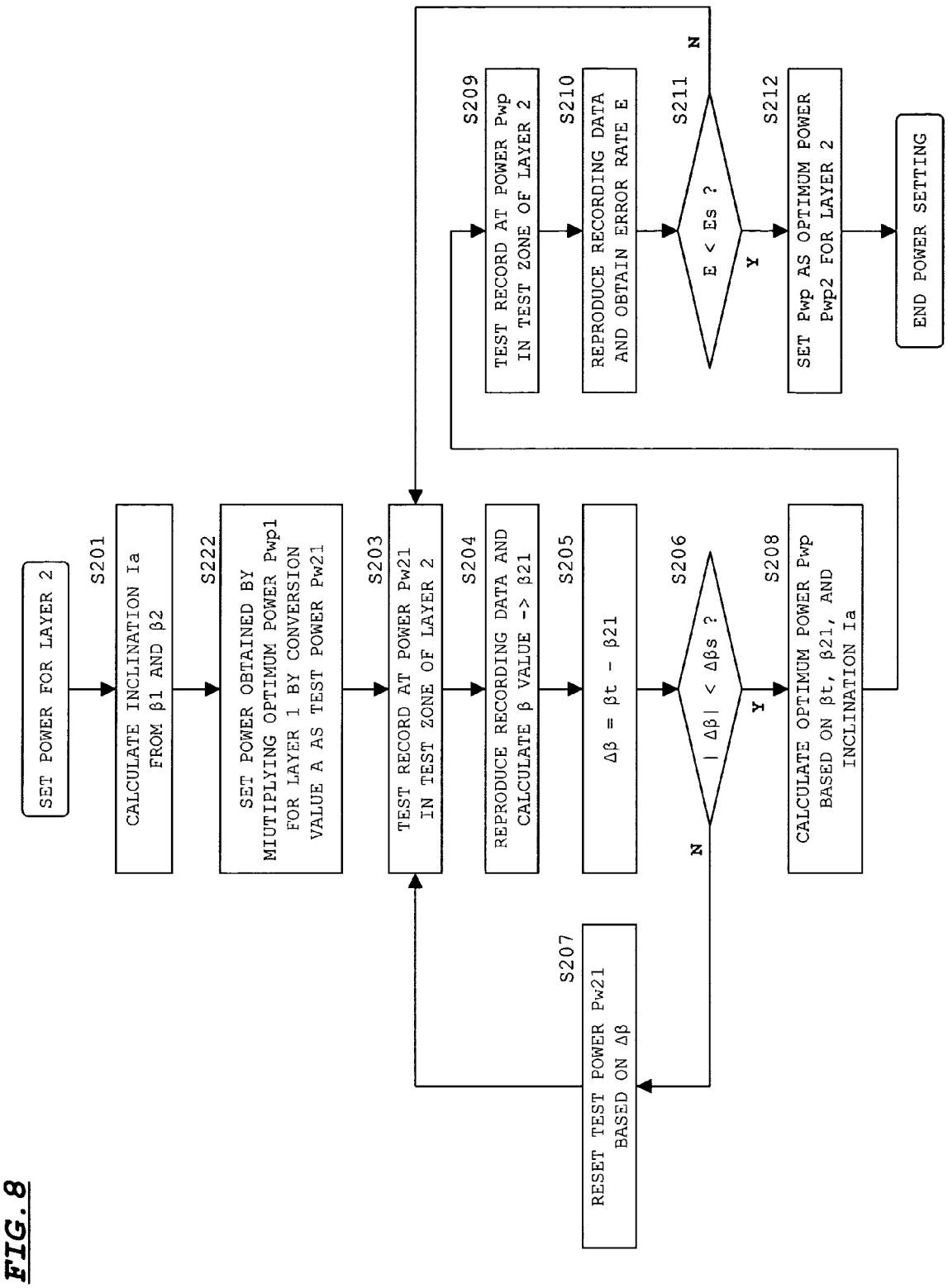
FIG. 8 is a flowchart of a power setting process of Layer 2 according to Embodiment 3.

FIG. 8 shows a process flow in the power setting for Layer 2. Note that the process flow for Layer 1 is performed following the flowchart of FIG. 4 as in Embodiments 1 and 2.

In the process flow shown in FIG. 8, S202 in the process flow of FIG. 5 according to Embodiment 1 is replaced by S222. Other steps are similar to those of FIG. 5.

The controller 111 reads out a conversion value A (conversion rate) of the disc from the sensitivity conversion table based on the manufacture ID of the disc in step S222. Here, the conversion value A is a value indicating how many % of the laser beam intensity in Layer 2 as compared with the case of Layer 1 to realize substantially the same recording sensitivity to Layer 1 is necessary when the pulse waveforms (strategies) in the recording operation are made equal to each other. Note that when the corresponding manufacture ID is not stored in the sensitivity conversion table, an average conversion value is read out from the sensitivity conversion table. The sensitivity conversion table stores the average conversion value for a general use to cope with such cases.

After that, the controller 111 multiplies the optimum power Pwp1 obtained in the process flow for Layer 1 by the conversion value A to set the calculation result as the test power Pwp21 for Layer 2. Subsequently, the controller 111 kept the pulse waveform (strategy) for Layer 2 uniform, and executes the same process of Embodiment 1 (S203 to S212) to perform power setting for Layer 2.

According to this embodiment, as in Embodiment 1, in the OPC operation for Layer 2, calculation of the approximation line can be performed by only one time of the test recording, so the OPC process for Layer 2 can be executed simply and quickly. At this time, as a power obtained by multiplying the optimum power Pwp1 for Layer 1 by the conversion value A of the disc is set as the initial power to obtain a β value, the β value can be set close to the target β value (βt) of the disc, the approximate line can be set close to the desired approximate line. Thus, even when the test recording is performed only one time in the OPC, it is possible to set the optimum power for Layer 2 smoothly and satisfactorily.

Note that according to this embodiment, in the OPC operation for Layer 2, the approximate line is obtained from the inclination Ia and β21. However, as in Embodiment 2, two β values are obtained, and based on the values, the approximate line can also be obtained.

Figure 9:
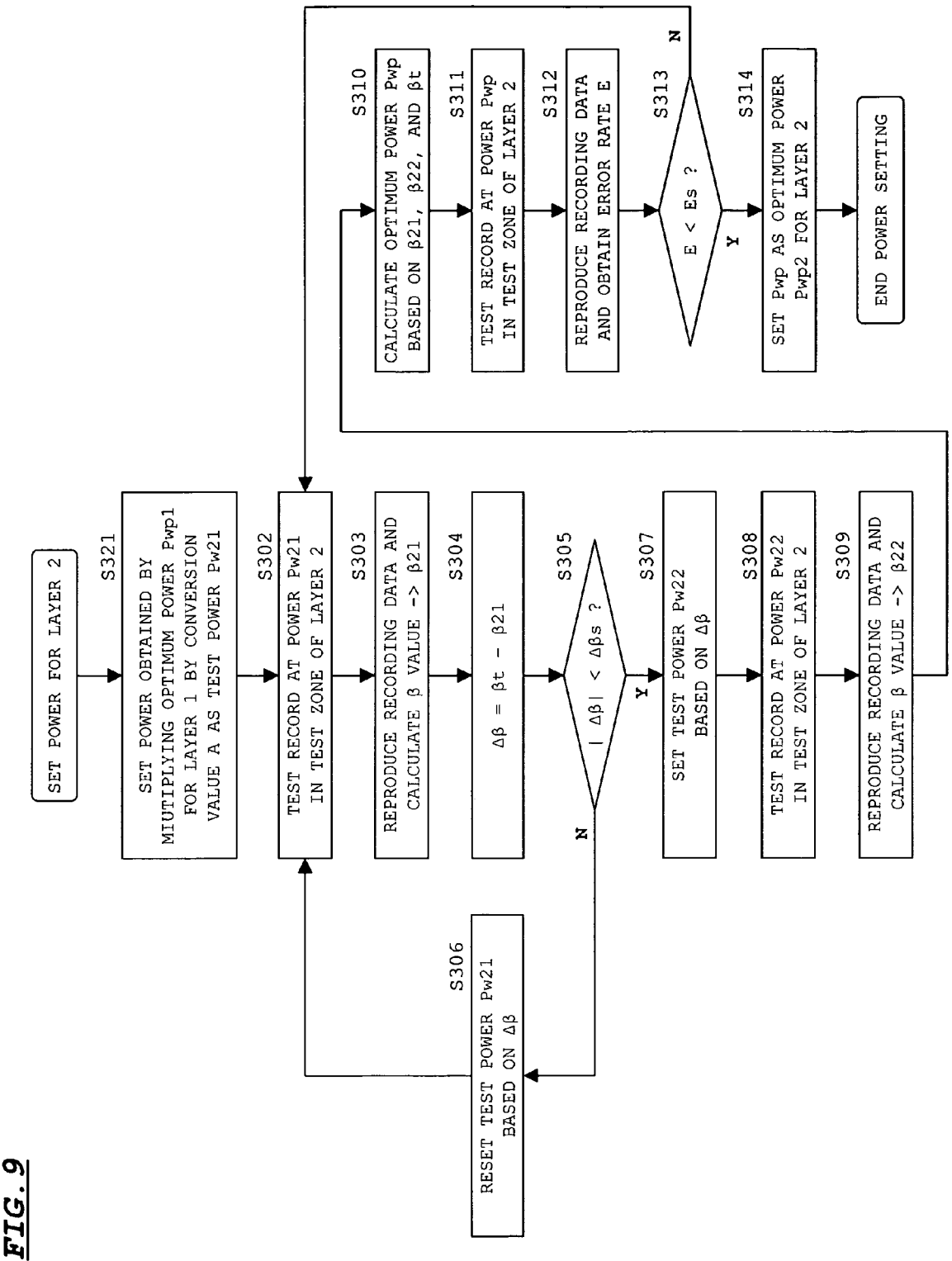
FIG. 9 a flowchart of a power setting process of Layer 2 according to Embodiment 2.
Figure 10:
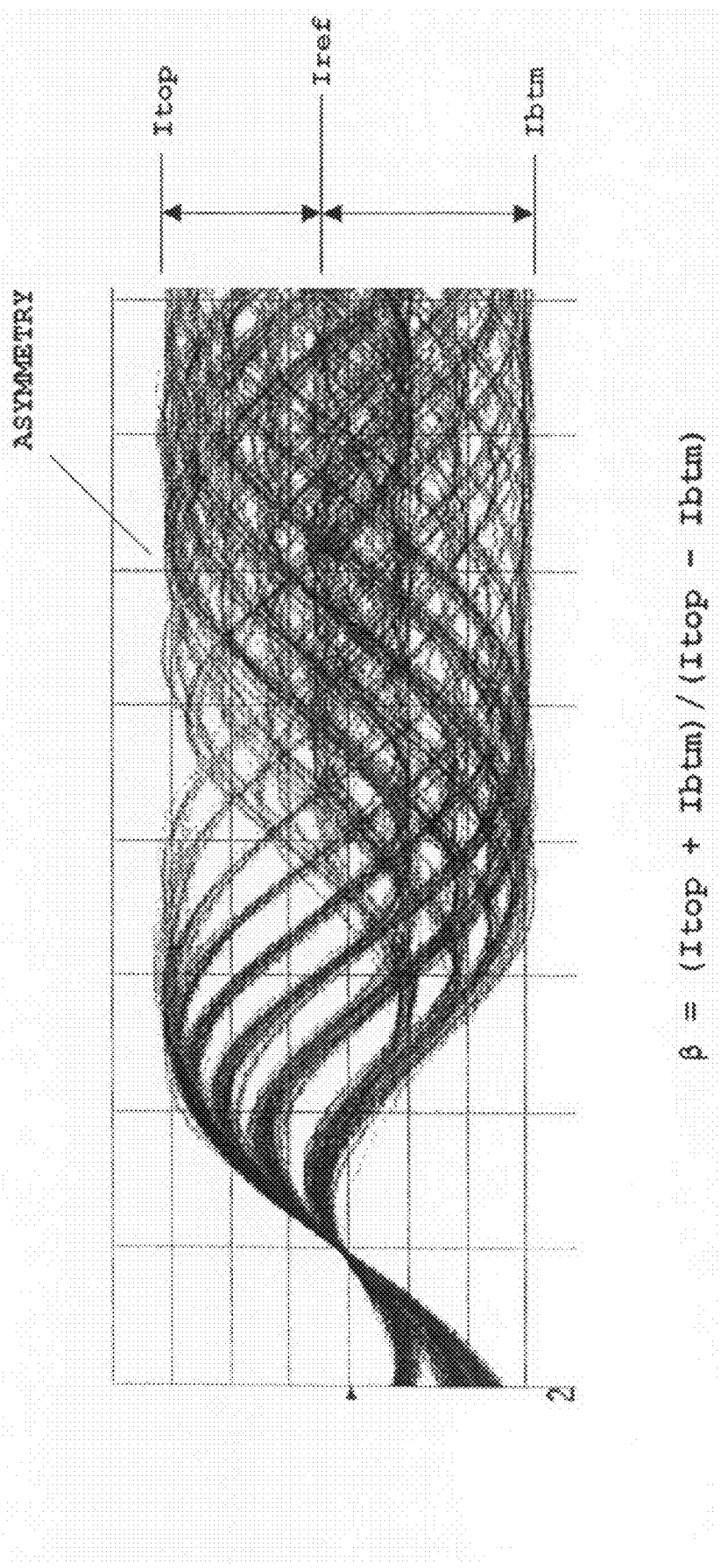
FIG. 10 is a drawing for explaining a calculation method for a β value.

FIG. 9 shows a process flow used in this case. In the process flow, S301 in the process flow of FIG. 6 according to Embodiment 2 is replaced by S321. Other steps are similar to those of the process flow in FIG. 6. That is, in S321, the conversion value A of the disc is read out from the sensitivity conversion table based on the manufacture ID of the disc. Then, the optimum power Pwp1 for Layer 1 obtained in the process flow for Layer 1 is multiplied by the conversion value A, and the calculation result is set as the test power Pwp21 for Layer 2. Subsequently, the pulse waveform (strategy) for Layer 2 is equalized, and the same process as those of Embodiment 2 (S302 to S314) are executed, to perform power setting for Layer 2.

In this case, as in Embodiment 2, there is an effect in that setting of the optimum power for Layer 2 can be performed smoothly and quickly.

Note that in Embodiment 3, when judged that E≧Es in S211, the flow returns to S203 but may transit to the process flow of FIG. 9. In this way, after judged that E≧Es in S211, it is possible to perform the optimum power setting for Layer 2 with more certainty.

The embodiment mode and embodiments of the present invention have been described, but the present invention is not limited to the above and can have other various modifications.

For example, in the above, the DVD+R and the optical disc drive therefor are exemplified, but of course the present invention can be applied to other optical discs such as a DVD−RW and recording and reproducing apparatuses therefor.

Further, in the above, the optical disc having two recording layers arranged on one side is exemplified, but the number of the recording layers is not limited to two. The present invention can also be applied to an optical disc having three or more recording layers arranged on one side and a recording and reproducing apparatus therefor. In this case, for example, the optimum power Pwp1 obtained in the OPC for the first layer is used as the initial power for the second, third . . . layers. Alternatively, an optimum power Pwpn obtained in the OPC for an adjacent recording layer may be used as an initial power in the OPC for the next (n+1th) recording layer in such a manner that the optimum power Pwp1 obtained in the OPC for the first layer is used as the initial power for the second layer, and the optimum power Pwp2 obtained in the OPC for the second layer is used as the initial power for the third layer, and the like. In the latter case, compared with the former case, the β value obtained in the test recording at the initial power can be made close to the target β value (βt), and it can be assumed that the approximation line is set to the desired approximation line. Thus, setting of the optimum power for each layer can be performed smoothly and satisfactorily.

Note that when three or more recording layers are arranged on one surface, the number of recording layers on which the normal OPC is performed is not limited to one. For example, when there are five recording layers arranged, the normal OPC based on FIG. 4 can be performed on the first and fifth recording layers, and the OPC based on FIG. 5 can be performed on the second, third, and fourth recording layers.

Furthermore, the present invention can also be applied to not only an optical disc having recording layers arranged only on one side but also an optical disc having recording layers arranged on both sides by bonding or the like and its recording and reproducing apparatus. In this case, for example, the OPC based on the above embodiments is performed on each surface. Moreover, the area format, the track spiral direction for each layer, and the like are not limited to the embodiment mode. Furthermore, in the above, after the calculation of the optimum power Pwp, whether the setting of the optimum power Pwp is possible or not is checked based on the test write, but such checking process is omitted and the calculation optimum power can be set as it is as the optimum power for each layer.

The embodiment mode of the present invention can appropriately have various modifications within the scope of the technical idea indicated by the scope of claims.

What is claimed is:

1. An optical recording and reproducing apparatus for recording information on an optical recording medium having plural recording layers arranged in a laminating direction and reproducing the information from the optical recording medium, comprising:

laser power setting means for using an optimum power set value Pwpn obtained from a result of performing a test recording on a recording layer n as an initial power value in the test recording on another recording layer m to set an optimum power Pwpm for the other recording layer m, wherein the laser power setting means includes;

means for approximating a relation Rn between a recording power and a characteristic parameter of the recording layer n from the result of performing the test recording and on the recording layer n;

means for obtaining the optimum power set value Pwpn for the recording layer n from the relation Rn and a target value of the characteristic parameter;

means for setting the optimum power set value Pwpn for the recording layer n as the initial power value in the test recording on the other recording layer m;

means for approximating a relation Rm between a recording power and a characteristic parameter of the recording layer m based on the characteristic parameter obtained from the result of performing the test recording on the other recording layer m and the relation Rn between the recording power for the recording layer n and the characteristic parameter; and means for obtaining the optimum power set value Pwpm for the recording layer m from the relation Rm and a target value of the characteristic parameter;

means for obtaining plural β value from the result of performing the test recording on the recording layer n;

means for obtaining an approximation line Ln for approximating a relation between the recording power and the β value from the plural β values;

means for obtaining the optimum power set value Pwpn for the recording layer n from the approximation line Ln and a target β value;

means for obtaining an inclination In of the approximation line Ln;

means for setting the optimum power set value Pwpn as the initial power value in the test recording on the other recording layer m;

means for obtaining a sole β value from the result of test recording on the other recording layer m;

means for obtaining an approximation line Lm for approximating a relation between the recording power and the β value from the β value obtained from the result of test recording on the other recording layer m and the inclination In; and means for obtaining the optimum power set value Pwpm for the other recording layer m from the approximation line Lm and the target β value.

2. An optical recording and reproducing apparatus according to claim 1, wherein the laser power setting means further includes means for obtaining information on a ratio of a laser light sensitivity of the recording layer m to the recording layer n, wherein the laser power setting means sets a value obtained by multiplying the set value of the optimum power Pwpn obtained from the result of performing the test recording on the recording layer n by the ratio, as the initial power value in the test recording on the other recording layer m.

3. An optical recording and reproducing apparatus according to claim 2, wherein the means for obtaining information on the ratio of the laser light sensitivity of the recording layer m to the recording layer n includes a table for storing the ratio for a disc identification ID.

4. An optical recording and reproducing apparatus according to claim 2, wherein the other recording layer m is a recording layer adjacent to the recording layer n in the laminating direction.

5. An optical recording and reproducing apparatus for recording information on an optical recording medium having plural recording layers arranged in a laminating direction and reproducing the information from the optical recording medium, comprising:

a control circuit for using an optimum power set value Pwpn obtained from a result of performing a test recording on a recording layer n as an initial power value in the test recording on another recording layer m to set an optimum power Pwpm for the other recording layer m, wherein the control circuit executes the processings of:

approximating a relation Rn between a recording power and a characteristic parameter of the recording layer n from the result of performing the test recording on the recording layer n:

obtaining the optimum power set value Pwpn for the recording layer n from the relation Rn and a target value of the characteristic parameter;

setting the optimum power set value Pwpn for the recording layer n as the initial power value in the test recording on the other recording layer m:

approximating a relation Rm between a recording power and a characteristic parameter of the other recording layer m based on the characteristic parameter obtained from the result of performing the test recording on the recording layer m and the relation Rn between the recording power for the recording layer n and the characteristic parameter;

obtaining an optimum power set value Pwpm for the other recording layer m from the relation Rm and a target value of the characteristic parameter;

obtaining plural β values from the result of performing the test recording on the recording layer n;

obtaining an approximation line Ln for approximating a relation between the recording power and the β value from the plural β values;

obtaining the optimum power set value Pwpn for the recording layer n from the approximation line Ln and a target β value;

obtaining an inclination In of the approximation line Ln;

setting the optimum power set value Pwpn as the initial power value in the test recording on the other recording layer m;

obtaining a sole β value from the result of the test recording on the other recording layer m;

obtaining an approximation line Lm for approximating a relation between the recording power and the β value from the β value obtained from the result of the test recording on the other recording layer m and the inclination In; and obtaining the optimum power set value Pwpm for the other recording layer m from the approximation line Lm and the target β value.

6. An optical recording and reproducing apparatus according to claim 5, wherein the control circuit obtains information on the ratio from a table for storing the ratio of the laser light sensitivity of the recording layer m for a disc identification ID.

* * * * *